(12) United States Patent
Buehlmeyer et al.

(10) Patent No.: US 9,266,447 B2
(45) Date of Patent: Feb. 23, 2016

(54) VEHICLE SEAT AND COMMERCIAL VEHICLE

(71) Applicant: GRAMMER AG, Amberg (DE)

(72) Inventors: Katja Buehlmeyer, Kuemmersbruck (DE); Roland Uebelacker, Pfreimd (DE); Sergej Schustjew, Sulzbach-Rosenberg (DE)

(73) Assignee: Grammer AG, Amberg (DE)

( * ) Notice: Subject to any disclaimer, the term of this patent is extended or adjusted under 35 U.S.C. 154(b) by 69 days.

(21) Appl. No.: 13/691,055

(22) Filed: Nov. 30, 2012

(65) Prior Publication Data

US 2013/0181500 A1 Jul. 18, 2013

(30) Foreign Application Priority Data

Nov. 30, 2011 (DE) .......................... 10 2011 055895
Nov. 30, 2011 (DE) .......................... 10 2011 055897
May 14, 2012 (DE) .......................... 10 2012 104184

(51) Int. Cl.
| | |
|---|---|
| A47C 31/00 | (2006.01) |
| B60N 2/38 | (2006.01) |
| B60N 2/46 | (2006.01) |
| B60N 2/24 | (2006.01) |
| A47C 7/00 | (2006.01) |

(52) U.S. Cl.
CPC .. B60N 2/38 (2013.01); B60N 2/24 (2013.01); B60N 2/464 (2013.01); B60N 2/4606 (2013.01); B60N 2/468 (2013.01); B60N 2/4613 (2013.01); B60N 2/4646 (2013.01); A47C 7/002 (2013.01); A47C 31/00 (2013.01)

(58) Field of Classification Search
CPC .................................. A47C 31/00; B60N 2/22
USPC .................... 297/463.1, 216.1, 184.1–184.17
See application file for complete search history.

(56) References Cited

U.S. PATENT DOCUMENTS

| | | | |
|---|---|---|---|
| 769,495 A | 9/1904 | Schroeder | |
| 937,343 A | 10/1909 | Wallace | |
| 1,257,427 A | 2/1918 | Underwood | |

(Continued)

FOREIGN PATENT DOCUMENTS

| | | |
|---|---|---|
| AT | 321497 | 4/1975 |
| DE | 1796557 | 9/1959 |

(Continued)

OTHER PUBLICATIONS

Official Action (no English translation available) for German Patent Application No. 102013110445.2 dated Mar. 10, 2014, 3 pages.

(Continued)

*Primary Examiner* — Syed A Islam
(74) *Attorney, Agent, or Firm* — Sheridan Ross P.C.

(57) ABSTRACT

The invention relates to a vehicle with a seat part, a backrest part, and a side part, particularly an armrest part, for collectively supporting a vehicle operator in his seated position on the vehicle seat, wherein the vehicle seat is characterized in that a supplemental vehicle operator support device that is arranged on the side part of the vehicle seat, and that can be temporarily arranged in an otherwise vehicle seat-free support area, and by means of which a vehicle operator seated on the vehicle seat can be additionally supported when in a laterally or rear-oriented seated working position.

14 Claims, 5 Drawing Sheets

(56) References Cited

U.S. PATENT DOCUMENTS

| | | | |
|---|---|---|---|
| 2,219,799 A | | 10/1940 | Zuck et al. |
| 2,306,334 A | | 12/1942 | Costas |
| 2,777,531 A | * | 1/1957 | Erickson .................. 180/270 |
| 2,835,311 A | | 5/1958 | Reeves et al. |
| 3,300,249 A | | 1/1967 | Schneider |
| 3,342,523 A | | 9/1967 | Lutgen |
| 3,342,528 A | | 9/1967 | Radke et al. |
| 3,348,880 A | | 10/1967 | Swann |
| 3,393,938 A | | 7/1968 | Meyer et al. |
| 3,888,329 A | * | 6/1975 | Monaghan .................. 280/734 |
| 4,108,493 A | | 8/1978 | Naus |
| 4,195,882 A | | 4/1980 | Daswick |
| 4,634,176 A | | 1/1987 | Scott |
| 4,679,854 A | | 7/1987 | Putsch et al. |
| 5,108,150 A | | 4/1992 | Stas |
| 5,154,477 A | | 10/1992 | Lacy |
| 5,211,696 A | | 5/1993 | Lacy |
| 5,308,028 A | | 5/1994 | Kornberg |
| 5,547,247 A | * | 8/1996 | Dixon ......................... 297/145 |
| 5,567,015 A | | 10/1996 | Arias |
| 5,803,542 A | | 9/1998 | Insausti |
| 6,079,784 A | | 6/2000 | Peachey |
| 6,224,149 B1 | * | 5/2001 | Gevaert ....................... 297/162 |
| 6,305,749 B1 | | 10/2001 | O'Connor et al. |
| 6,513,781 B1 | | 2/2003 | Meyer et al. |
| 6,648,416 B2 | | 11/2003 | O'Connor et al. |
| 6,893,095 B2 | | 5/2005 | Schambre et al. |
| 6,942,297 B2 | | 9/2005 | Johnson |
| 7,178,874 B2 | | 2/2007 | Demski |
| 7,210,735 B2 | * | 5/2007 | Lang ........................... 297/155 |
| 7,640,090 B2 | | 12/2009 | Uchida et al. |
| 7,780,237 B2 | | 8/2010 | Chen et al. |
| 7,931,331 B2 | | 4/2011 | Gomes et al. |
| 8,007,045 B2 | | 8/2011 | Meiller et al. |
| 8,794,705 B2 | | 8/2014 | Steinmetz et al. |
| 2001/0000639 A1 | * | 5/2001 | Park et al. .................. 297/411.3 |
| 2003/0155797 A1 | | 8/2003 | Amirault et al. |
| 2003/0178880 A1 | | 9/2003 | Hannah |
| 2005/0194827 A1 | * | 9/2005 | Dowty et al. .............. 297/411.3 |
| 2015/0001903 A1 | | 1/2015 | Schneider |
| 2015/0015045 A1 | | 1/2015 | Uebelacker et al. |
| 2015/0015046 A1 | | 1/2015 | Uebelacker et al. |
| 2015/0015047 A1 | | 1/2015 | Uebelacker |

FOREIGN PATENT DOCUMENTS

| | | |
|---|---|---|
| DE | 7228055 | 11/1972 |
| DE | 2551617 | 6/1977 |
| DE | 2644485 | 4/1978 |
| DE | 3046049 | 7/1982 |
| DE | 4126518 | 2/1993 |
| DE | 4215628 | 11/1993 |
| DE | 4405397 | 3/1995 |
| DE | 19937378 | 7/2000 |
| DE | 19920220 | 11/2000 |
| DE | 20307102 | 10/2003 |
| DE | 69913203 | 9/2004 |
| DE | 19628861 | 6/2005 |
| DE | 102004007043 | 6/2005 |
| DE | 102004052604 | 4/2006 |
| DE | 60116924 | 11/2006 |
| DE | 102006028453 | 12/2007 |
| DE | 102007044319 | 7/2008 |
| DE | 102007012133 | 9/2008 |
| DE | 202007016357 | 3/2009 |
| DE | 102010009526 | 8/2011 |
| DE | 102011055895 | 6/2013 |
| EP | 0729867 | 9/1996 |
| EP | 0972671 | 1/2000 |
| EP | 2599658 | 6/2013 |
| EP | 2599659 | 6/2013 |
| FR | 2748432 | 11/1997 |
| FR | 2895336 | 6/2007 |
| FR | 2927855 | 8/2009 |
| FR | 2929185 | 10/2009 |
| FR | 2930208 | 10/2009 |
| FR | 2932429 | 12/2009 |
| GB | 2277869 | 11/1994 |
| GB | 2453165 | 4/2009 |
| GB | 2472836 | 2/2011 |
| WO | WO 03/068556 | 8/2003 |
| WO | WO 2011/020919 | 2/2011 |

OTHER PUBLICATIONS

Official Action (no English translation available) for German Patent Application No. 102013110448.7 dated Mar. 10, 2014, 3 pages.
Official Action (no English translation available) for German Patent Application No. 102013110416.9 dated Mar. 7, 2014, 3 pages.
Examination Report for German Patent Application No. 102010018822.0, dated Jan. 31, 2013, 3 pages.
Extended European Search Report for European Patent Application No. 12194405.2, mailed Feb. 8, 2013, 3 pages.
Official Action for U.S. Appl. No. 13/686,409 mailed Apr. 24, 2014, 12 pages.
Official Action for U.S. Appl. No. 13/686,337 mailed Apr. 24, 2014, 11 pages.
U.S. Appl. No. 13/686,337, Buehlmeyer et al.
U.S. Appl. No. 13/686,409, Buehlmeyer et al.
Extended European Search Report for European Patent Application No. 12194557, mailed Feb. 7, 2013, 3 pages.
Examination Report for German Patent Application No. 102011055895.0, dated Feb. 29, 2012, 3 pages.
Examination Report for German Patent Application No. 102011055895.0, dated Oct. 2, 2012, 3 pages.
Examination Report for German Patent Application No. 102011055897.7, dated Feb. 27, 2012, 3 pages.
Official Action for German Patent Application No. 102012104184.9 dated Jan. 21, 2013, 3 pages.
Examination Report for German Patent Application No. 102011055897.7, dated Jul. 25, 2014, 8 pages.
Extended European Search Report for European Patent Application No. 14163935.1, dated Oct. 30, 2014, 6 pages.
Official Action (with English translation) for Chinese Patent Application No. 2012104992473, dated Nov. 3, 2014, 13 pages.
Official Action (with English translation) for Chinese Patent Application No. 201210489228, dated Dec. 1, 2014, 29 pages.
European Search Report for European Patent Application No. 14163934.4, mailed Oct. 28, 2014, 6 pages.
Official Action (no English translation available) for German Patent Application No. 102013106721.2 dated Mar. 11, 2014, 3 pages.
Official Action for U.S. Appl. No. 13/686,337, mailed Dec. 2, 2014 12 pages.
Notice of Allowance for U.S. Appl. No. 13/686,409 mailed Nov. 28, 2014, 8 pages.
Official Action (no English translation available) for German Patent Application No. 12194557.0, dated Jan. 29, 2015, 5 pages.
Notice of Allowance for U.S. Appl. No. 13/686,337, mailed Apr. 24, 2015 9 pages.
Official Action for U.S. Appl. No. 14/278,190, mailed May 22, 2015, 8 pages.
Final Action for U.S. Appl. No. 14/278,190, mailed Oct. 29, 2015, 8 pages.
Official Action for U.S. Appl. No. 14/314,519, mailed Jun. 25, 2015, 9 pages.
Notice of Allowance for U.S. Appl. No. 14/314,519, mailed Oct. 15, 2015, 5 pages.

* cited by examiner

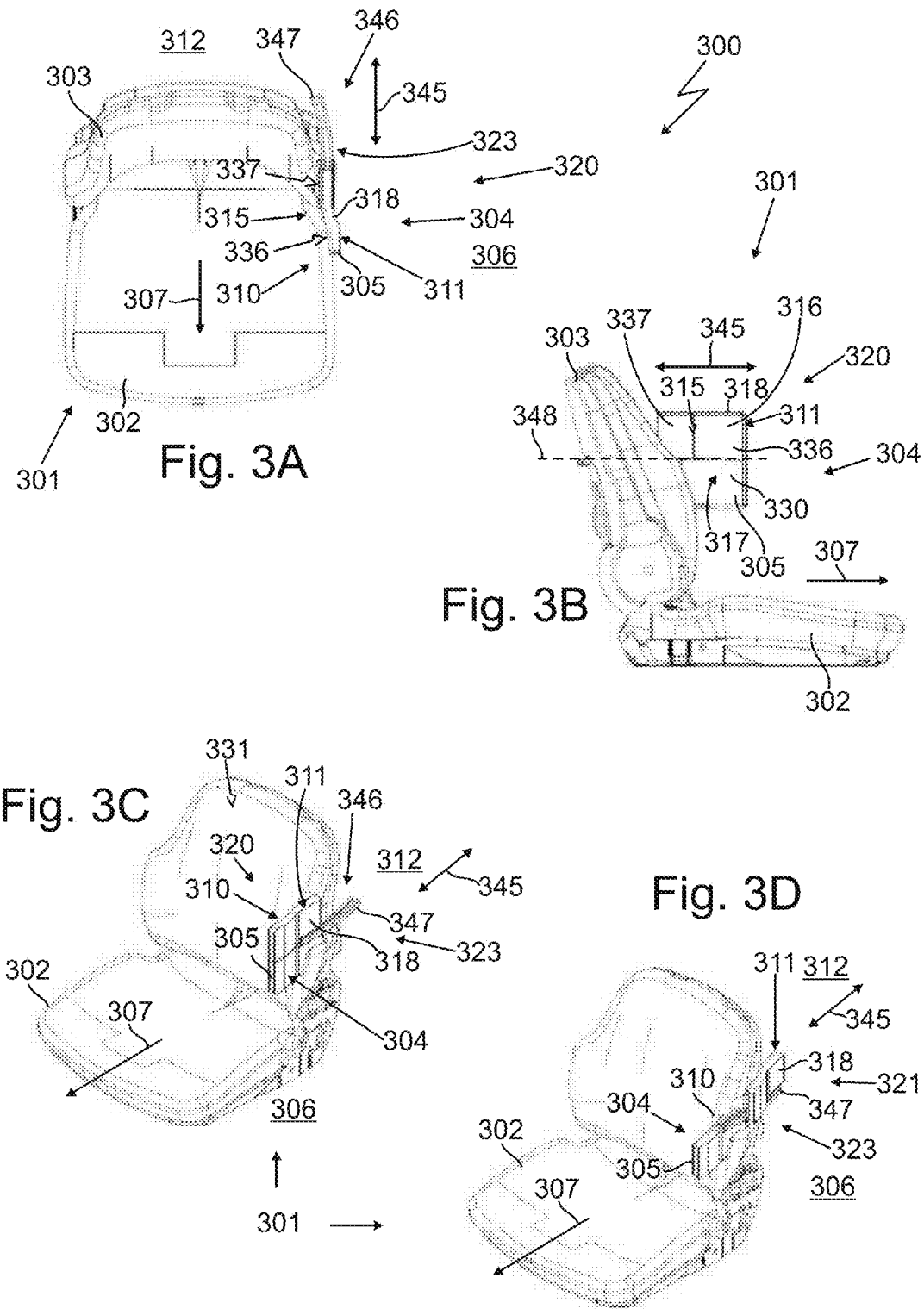

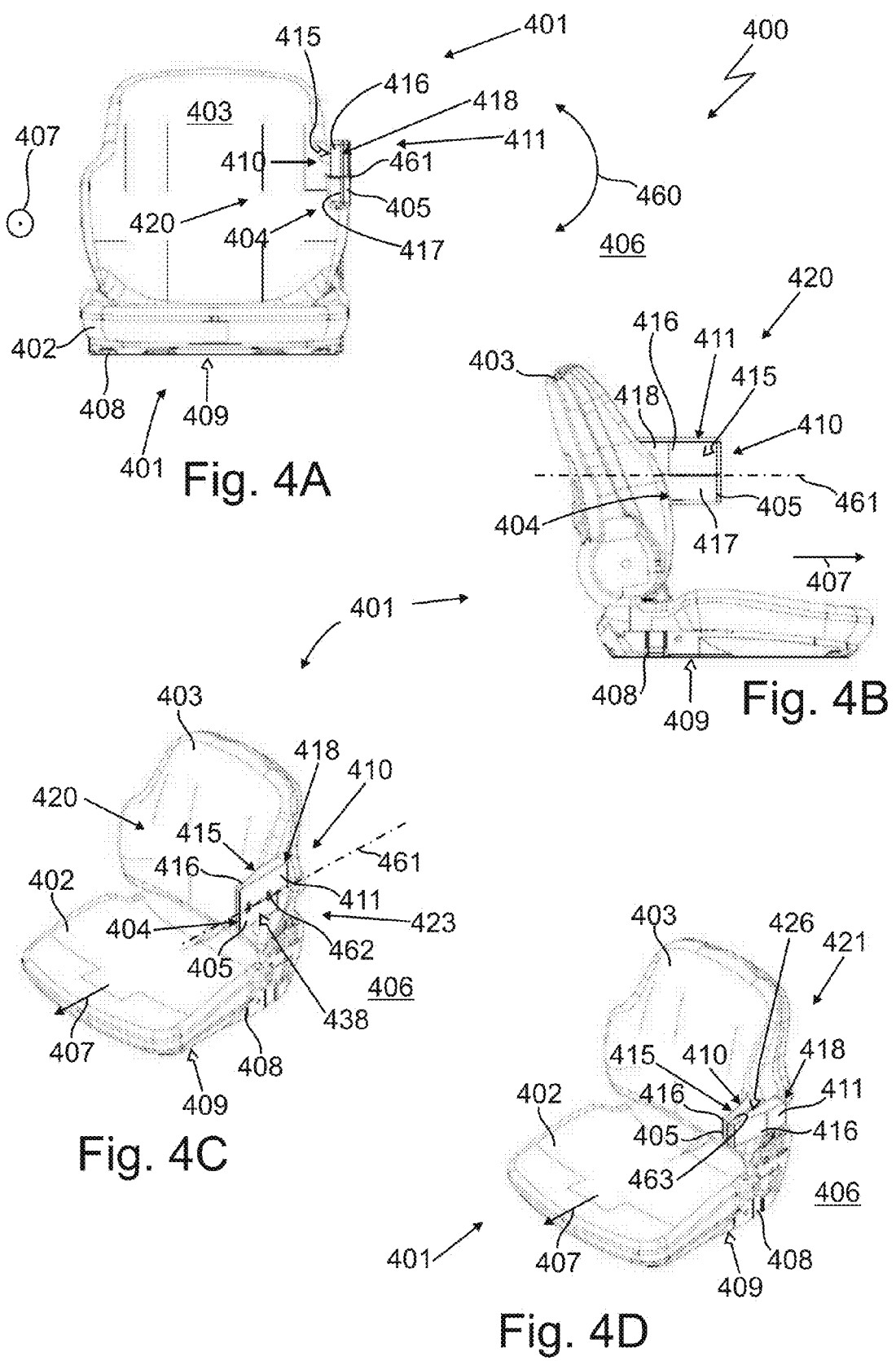

VEHICLE SEAT AND COMMERCIAL VEHICLE

CROSS REFERENCE TO RELATED APPLICATIONS

This application claims the benefit of German Patent Application No. 10 2011 055895.0 filed Nov. 30, 2011, German Patent Application No. 10 2012 104184.9 filed May 14, 2012, and German Patent Application No. 10 2011 055897.7 filed Nov. 30, 2011, the disclosures of each of which are incorporated herein by reference.

The invention relates to a vehicle seat with a seat part, with a backrest part and with a side part, particularly an armrest part, for collectively supporting a vehicle operator in a seated position on the vehicle seat.

The invention further relates to a commercial vehicle, particularly to an agricultural commercial vehicle, with a vehicle seat for a vehicle operator.

A variety of vehicle seats of this general type, particularly for commercial vehicles and especially for agricultural commercial vehicles, are well known from the prior art.

Particularly vehicle operators of agricultural commercial vehicles, when working with these agricultural commercial vehicle and equipment attached thereto, often assume a seated working position over a long period of time in which they face laterally or backwards with respect to the normal seated driving position facing in the direction of travel in order, for example, to better reach and operate control elements arranged to the side or rear in the vehicle cab, or only to better observe a piece of equipment attached behind the agricultural commercial vehicle for an extended period of time.

At present, with the aid of a rotation adapter, vehicle operators can swivel the entire vehicle seat, i.e., the entire substantially rigid seat construction together with seat part and backrest part, about a defined axis of rotation in order to better reach the space in the rear within the vehicle cab or to better observe outside of the vehicle cab. In doing so, the seat part remains stationary in relation to the backrest part. One consequence of this is that the vehicle operator must turn out of a comfortable seat cushion contour of the vehicle seat in order to continue operating, particularly, the pedals of the agricultural commercial vehicle in a somewhat safe manner. This can lead to points of pressure and hence discomfort, particularly in the area of the vehicle operator's buttocks and thighs.

Any attaching parts on the vehicle seat, for example a multifunction armrest, also swivel in relation thereto. Control levels that are arranged further to the rear and side in the vehicle cab still cannot be operated comfortably as a result.

The back cushion contour is currently structured such that the vehicle operator is supported to the greatest extent possible in the forward-facing seated driving position without taking away from him the necessary degrees of freedom that he requires for his movements while driving. In order not to impede the freedom of movement in the shoulder/arm area, the back cushion of the backrest part must not be excessively contoured in the upper portion. However, to ensure good support and thus a good level of relief for the vehicle operator, a support surface should be as large as possible in all operating positions. For the aforementioned reasons, such as the degrees of freedom required for good movement, this can only be achieved to a certain and unsatisfactory extent at present, since the operator switches between two extremely different operating positions.

Another substantial drawback is that the possible swivel range of the rotation adapter is limited because the commercial vehicle must continue to be steered safely in traffic by use of the pedals and steering wheel even while the rear equipment is being monitored. To respond to these demands, the vehicle operator must often assume an awkward posture over a long period of time, which undeniably leads to a critical level of torsion of the entire body. In addition, scientific studies show that such an awkward posture, particularly under vibrational stress, can damage the bodily structures, especially if the body is not supported sufficiently. Moreover, it is clear that the stress on the spinal column can be significantly reduced through good support by means of the backrest part.

It is the object of the invention to provide improved seating comfort to a vehicle operator, especially when assuming an awkward posture, in order to enable reliable and, particularly, safe operation of an agricultural commercial vehicle in particular. Through the relief of the burden on the bodily structures of the vehicle operator, premature fatigue is prevented, thus increasing productivity.

The object of the invention is achieved by a vehicle seat with a seat part, with a backrest part and with a side part, particularly an armrest part, for collectively supporting a vehicle operator in a seated position on the vehicle seat, with the vehicle seat being characterized by a supplemental vehicle operator support device arranged on the side part of the vehicle seat that can be temporarily arranged in an otherwise vehicle seat-free support area and by means of which a vehicle operator seated on the vehicle seat can be additionally supported while in a laterally or rear-facing seated working position.

Through the supplemental vehicle operator support device arranged on the side part, an advantageous supplemental support structure surface for the vehicle operator can be made available in a structurally extraordinarily simple manner, so that the vehicle operator can be supplementally supported as needed and temporarily through an optional support beyond a seat part or armrest. This optional support is provided, particularly, in an area around the vehicle seat which advantageously remains free of components and assemblies in a normal support operating state in order not to impair operation.

According to the invention, the term "normal support operating state" describes an operating state at the vehicle seat in which the supplemental vehicle operator support device is inactive and therefore not available for supplemental support in the otherwise vehicle-seat-free support area.

In contrast to this, the term "special support operating state" is used here to describe another operating state at the vehicle seat that deviates from the normal support operating state and in which the supplemental vehicle operator support device is active, which is to say in which it is arranged in an otherwise vehicle seat-free support area and is available for supplemental bodily support.

The term "side part" describes herein a component belonging functionally to the vehicle seat which can be positioned to the side of the vehicle operator. The side part is either stationary or, ideally, can be swiveled out of the side area or into the side area. Generally, a side part of the vehicle seat as referred to according to the invention is embodied as an armrest part on which a vehicle operator can rest on one or both sides of the vehicle seat. Accordingly, the present side part can be provided on one or both sides of the vehicle seat.

The supplemental vehicle operator support device is preferably placed in such a way with respect to the vehicle seat that the vehicle operator can be supported at least at the level of his shoulder and/or rib cage area off-center to the side of the backrest part.

Advantageously, the supplemental vehicle operator support device arranged in this manner can provide the vehicle operator with extraordinarily good relief while in an awkward position, particularly the laterally or rear-facing seated working position described above. And the supplemental vehicle operator support device is preferably only available when it is required. Otherwise, for instance in a forward-facing operating position, the supplemental vehicle operator support device is not in the way, since it remains in its resting position or in its usual standby position.

According to the invention, the term "supplemental vehicle operator support device" describes a device for supplementally supporting the vehicle operator while in an awkward position on the vehicle seat. In this respect, it can be additionally supplemented by the armrest part, on which the vehicle operator could of course also support himself while in an awkward position. However, the armrest part alone can only provide support in the vehicle operator's pelvic area. This is not comfortable over an extended period of time, however, not to mention ergonomically inadequate. In order to provide significant relief to the vehicle operator's bodily structures, a support structure surface available to the vehicle operator must go beyond the currently existing armrest part.

In this respect, it is advantageous if the supplemental vehicle operator support device comprises a support structure surface for the vehicle operator's back and/or shoulder area, the support structure surface being advantageously ergonomically shaped in order to conform especially well to human anatomy. This promotes acceptance among vehicle operators of frequent use of such a supplemental support in the form of the present supplemental vehicle operator support device. In addition, the vehicle operator's body is especially well protected from injury by this kind of support structure surface, since things often get quite rough particularly when agricultural commercial vehicles are used in the field, and the vehicle operator is grateful for any targeted support.

According to the invention, the term "vehicle seat-free support area" describes an area on the vehicle seat or around the vehicle seat in which support devices cannot be sensibly placed in a permanent manner, since they would very much get in the way of the vehicle operator during normal operation.

Here, the present vehicle seat-free support area is, on the one hand, substantially in the upper third of the backrest part, i.e., preferably above the midpoint up the backrest part and therefore in the vehicle operator's direct lateral or rearward field of vision. It can optionally also be below this upper third. For this reason alone, this vehicle seat-free support area must absolutely be kept free during normal forward driving operation. Accordingly, it must not be confused with a conventional support area in which, for example, an arm rest device can be temporarily swung in and on which the vehicle operator can then rest his arm for relief.

On the other hand, the vehicle seat-free support area according to the invention is located off-center with respect to the backrest part when facing in the normal seating direction. For this reason alone, it must not be confused with a conventional support area in which a backrest extension device designed as a kind of head support is put in place. This is all the more the case given that the vehicle seat-free support area is also arranged in front of the backrest part and to the side thereof. In this respect, the present vehicle seat-free support area is also provided to the side of and above the seat part of the vehicle seat.

The description "laterally or rear-facing seated working position" refers here to an awkward position on the part of the vehicle operator substantially with respect to a torsion of the upper body in order to better observe a rear work area, particularly behind the agricultural commercial vehicle.

It should be pointed out here that the present vehicle seat according to the invention can be used advantageously not only for a vehicle operator. Rather, the vehicle seat according to the invention can be used in nearly every area of application in which a supplemental support device is to be made available at least temporarily in the vicinity of the vehicle seat.

It has proven advantageous in practice if the supplemental vehicle operator support device is arranged in an activatable manner on the side part or on the armrest part.

With this, the supplemental vehicle operator support device can be moved surprisingly quickly into the otherwise vehicle seat-free support area and just as quickly out of it.

In this respect, a preferred embodiment makes a provision that the supplemental vehicle operator support device is attached to the side part, particularly to the armrest part, by means of a displacement mechanism by means of which the supplemental vehicle operator support device is arranged such that it can be moved from a standby position on the side part, particularly on the armrest part, into a supplemental support position in the otherwise vehicle seat-free support area.

In the standby position, the supplemental vehicle operator support device is ideally arranged such that it is moved completely out of the otherwise vehicle seat-free support area. Here, the vehicle seat is in a normal operating state as conventionally known.

By contrast, the supplemental vehicle operator support device is in a working position when it is placed according to the present invention in the otherwise vehicle seat-free support area for supplemental support. According to the invention, the vehicle seat is in a special support operating state here.

The supplemental vehicle operator support device can therefore be advantageously moved by means of the displacement mechanism independently of the movement of the side part and of the armrest part.

An especially preferred embodiment makes a provision that a standby position of the supplemental vehicle operator support device is arranged at least partially within the side part, particularly within the armrest part. With this, the supplemental vehicle operator support device can be arranged at least partially within the side part, as a result of which it can be accommodated on the present vehicle seat in an extremely space-saving and therefore very well integrated manner.

One very simple and therefore advantageous embodiment in this context can be realized by arranging the supplemental vehicle operator support device so as to be vertically movable with respect to the side part, particularly with respect to the armrest part. Here, the supplemental vehicle operator support device can be retracted into the existing side part or armrest part and hence be moved out of the vehicle operator's range of motion and only moved out of the side part or armrest part as needed.

Moreover, it is advantageous if a standby position of the supplemental vehicle operator support device is arranged to the side of the side part, particularly to the side of the armrest part, on a side facing away from the seat part and/or the backrest part. Here, the supplemental vehicle operator support device can advantageously be parked next to the side part or armrest part when it is not in use. Here as well, the supplemental vehicle operator support device can be moved quickly into the otherwise vehicle seat-free support area or vice versa.

With an appropriately shaped side part or armrest part, the supplemental vehicle operator support device can be placed within a sheath formed by the outer dimensions of the side part or armrest part. In this respect, the supplemental vehicle operator support device is then also arranged at least partially more or less within the side part or armrest part.

If space permits, a standby position of the supplemental vehicle operator support device can also be arranged beneath the side part or armrest part, as a result of which the path between the standby position and the working position is enlarged accordingly for the supplemental vehicle operator support device.

In this context, the present displacement mechanism in particular can comprise substantially vertically-oriented guide elements on which the supplemental vehicle operator support device, with suitable sliding elements, for instance, can be moved upward or downward in a guided manner.

Alternatively or in addition, it is advantageous if a standby position of the supplemental vehicle operator support device is arranged such that it extends at least partially behind the backrest part. As a result of this, the supplemental vehicle operator support device can be arranged at least partially behind the backrest part even though it is attached to the armrest part. For example, the supplemental vehicle operator support device can be moved in approximately horizontal fashion out of the otherwise vehicle seat-free support area.

It is therefore also advantageous if the supplemental vehicle operator support device is arranged in a horizontally moveable manner with respect to the side part, particularly with respect to the armrest part. As a result of this, the supplemental vehicle operator support device can be moved into the above-described standby position over to behind the backrest part.

For example, the present displacement mechanism in particular can comprise substantially horizontally oriented guide elements on which the supplemental vehicle operator support device can be moved forward and backward in a guided manner, such as with suitable slide elements.

As will readily be understood, translational movements of the supplemental vehicle operator support device can overlap both vertically and horizontally.

In this respect, it is advantageous if the supplemental vehicle operator support device is arranged on the side part or on the armrest part in a vertically and/or horizontally moveable manner with respect to the side part, particularly with respect to the armrest part.

What is more, the supplemental vehicle operator support device can be positioned in an especially versatile and also very precise manner as needed if the supplemental vehicle operator support device is arranged on the side part, particularly on the armrest part, so as to be moveable along a curved path. Particularly good support of the vehicle operator can be ensured in this way.

Particularly, to create such an advantageous curved path, the present displacement mechanism can comprise appropriate curved cross-members on which associated slide elements can be guided.

With respect to another no less advantageous alternative, it is also advantageous if the supplemental vehicle operator support device is arranged on the side part, particularly on the armrest part, such that it can be folded and can rotate about a swivel axis.

Advantageously, the side part or armrest part can have an appropriate recess into which the supplemental vehicle operator support device can be folded when it is not needed. The supplemental vehicle operator support device therefore also lies substantially within the side part or armrest part when the vehicle seat is in the normal operating state according to the invention.

In this respect, it is advantageous if the supplemental vehicle operator support device is arranged on the side part or armrest part such that it can swivel at least 180° about the swivel axis. In this way, it can be swiveled from a substantially vertical working position into a substantially vertical standby position or vice versa, as a result of which it can be very advantageously positioned both in the special support operating state and in the normal operating state.

If the supplemental vehicle operator support device can only be swiveled by about 90°, it can be oriented horizontally in a standby position, for example, in order to enlarge or make avail- able an armrest surface. If it is then swiveled 90° upward, a supplemental support surface in terms of the present invention can be made available with it.

As will readily be understood, depending on the prevailing space conditions in a vehicle cab and/or on a vehicle seat, other swivel angles can also be advantageously provided.

To implement such a folding mechanism in particular, the present displacement mechanism can particularly comprise appropriate hinge elements to guide the supplemental vehicle operator support device, bolt elements to guide and/or stop the supplemental vehicle operator support device, as well as stop elements for positioning the supplemental vehicle operator support device, magnet elements for holding the supplemental vehicle operator support device, and fixing means of any of a wide variety of types for fixing the supplemental vehicle operator support device particularly in the working position.

The supplemental vehicle operator support device can be moved from the standby position into the supplemental support position in an especially stable manner if the displacement mechanism thus has means for the rotatory and/or translational displacement of the supplemental vehicle operator support device.

Moreover, it is advantageous if the supplemental vehicle operator support device comprises a stationary partial support area the surface of which is augmented by a moveable partial support area. For example, the supplemental vehicle operator support device makes use of at least a partial area of the existing side part or armrest part and augments it with the moveable partial support area. This makes it possible to increase the support comfort even more. What is more, the supplemental vehicle operator support device can thus be made available in a structurally more compact and even simpler manner.

Moreover, the supplemental vehicle operator support device can be structurally further simplified if the supplemental vehicle operator support device advantageously comprises a panel element that has a supplemental support surface and that is moveable with respect to the seat part, the backrest part and the side part, particularly the armrest part.

The supplemental vehicle operator support device or, particularly, the moveable panel element can be embodied in a single piece or even multiple pieces, in which case individual segments are joined together in a foldable manner.

For example, the supplemental vehicle operator support device or the moveable panel element is designed to be double- or triple-folding.

Here, individual segments of the supplemental vehicle operator support device or of the moveable panel element can also be rolled up in order to facilitate stowing in a standby position.

It is also possible for the supplemental vehicle operator support device or, particularly, the moveable panel element to first be moved translationally out of a standby position, for example upwards, and then swiveled or tipped as a whole or in segments along a circular arc into a working position.

Preferably, this supplemental support surface disappears into or under the side part or armrest part when the supplemental vehicle operator support device is inoperative. Or the supplemental support surface disappears behind the backrest part of the vehicle seat. As will readily be understood, the supplemental vehicle operator support device is appropriately mounted and parked here on the side part or armrest part.

It is furthermore advantageous if the supplemental vehicle operator support device can be arranged directly above a substantially horizontal arm support surface of the vehicle seat. In this way, the armrest part can advantageously extend the supplemental vehicle operator support device on the bottom side.

Moreover, in the special support operating state of the present vehicle seat, the supplemental vehicle operator support device can be arranged in a structurally extremely simple manner inside the otherwise vehicle seat-free support area starting from the side part or the armrest part.

In order to use the supplemental vehicle operator support device advantageously, it is advantageous if the vehicle seat has an actuating device for actuating the supplemental vehicle operator support device, the actuating device being arranged on the side part, particularly on the armrest part, and/or on the backrest part.

If the actuating device is or if actuating elements, such as push buttons or the like, thereof are located on the side part or on the armrest part, the function of the supplemental vehicle operator support device can be controlled in an intuitively simple manner by a supporting movement of the forearm on the side part or the armrest part or a manual pressure actuation of the actuating elements.

Alternatively or in addition, if the actuating device is or actuating elements such as push buttons or the like are provided on the backrest part and/or on the seat part, the functionality with respect to the control of the supplemental vehicle operator support device can be set up in another or more differentiated manner.

The supplemental vehicle operator support device can be used especially easily if it is arranged on the backrest part on a cushion part such that it can be actuated by means of a pressure actuation mechanism. For example, the pressure actuation mechanism is arranged in an upper-right edge area of the backrest part. In this way, the supplemental vehicle operator support device can automatically follow the vehicle operator's movement, as a result of which the vehicle operator can be unburdened especially effectively, since he need not operate any additional control elements.

If the supplemental vehicle operator support device is thus arranged so as to be interactively actuatable depending on the position of the body, it can be activated extremely easily without the vehicle operator having the need to manually actuate control elements in order to activate the supplemental vehicle operator support device.

The expression "depending on the position of the body" describes herein the advantageous activation or actuation of the supplemental vehicle operator support device only by moving the body in the vehicle seat or its cushioned parts.

For example, to trigger pressure sensors arranged, for example, inside of the backrest part which detect a pressure load or a change in pressure load on the vehicle seat caused by the vehicle operator. In response to a certain pressure pattern, the supplemental vehicle operator support device can then be activated and moved from the standby position into the otherwise vehicle seat-free support area.

In this respect, another advantageous embodiment makes a provision that the vehicle seat has on the backrest part an interactive actuating device which depends on the position of the vehicle operator, with the supplemental vehicle operator support device being arranged on the backrest part such that it can be actuated by means of a pressure actuation mechanism on a cushion part of the backrest part.

Advantageously, a body position or a change in body position can, alternatively or in addition, also be monitored using vehicle seat environment detection in order to then anticipate an imminent change in body position based on a certain pattern of behavior and initiate the activation of the supplemental vehicle operator support device early on.

As will readily be understood, many other technical possibilities can also be drawn upon in order to implement such an interactive actuation.

For example, the body position can also be detected preferably using a force sensor or a capacitative sensor or sensors that function in other ways that are able to effectively detect a change in the vehicle operator's position. As soon as the system detects a change in position, the vehicle seat according to the invention changes its support surfaces to support the vehicle operator.

An advantageous modification of the present invention can be achieved if the seat part, the backrest part and the side part or the armrest part form a main outer contour of the vehicle seat and the supplemental vehicle operator support device is held on the side part or armrest part such that it can be temporarily arranged outside of the main outer contour.

Advantageously, when not being used, the supplemental vehicle operator support device can lie behind this main outer contour or contribute to the delimiting and shaping thereof so that it does not get in the way of the seating or vehicle seat area, especially during normal operation in which the vehicle operator assumes a forward-facing operating position. In this respect, circumferential visibility from the agricultural commercial vehicle is also not negatively impacted, which is of considerable importance with regard to both driving safety and working safety, since accidents involving people located within the working radius of the agricultural commercial vehicle can thus be prevented.

Moreover, an especially advantageous embodiment makes a provision that the vehicle seat, in addition to the normal support operating state, has at least one special support operating state in which the supplemental vehicle operator support device can be arranged in front of the backrest part such that it temporarily delimits a vehicle operator movement free space above and/or to the side of the seat part.

According to the invention, through the delimited vehicle operator movement free space, an advantageous supplemental vehicle operator support can be temporarily made available in order to advantageously unburden the vehicle operator with respect to an awkward position he has assumed.

Moreover, it should also be mentioned here for the sake of completeness that, alternatively, the activation of the supplemental vehicle operator support device can also be initiated manually by providing operator controls that can be actuated manually in all cases or optionally, as already mentioned above.

The invention is further characterized in that it prevents, for one, the drawback of the previously used rotation adapter, particularly with respect to the otherwise twisted seat cushion part. The seat cushion preferably remains in its original established position, which is to say it does not rotate about a vertical axis, and is therefore able to provide optimum support for the vehicle operator's buttocks and the lower body. Optionally, a slight swiveling motion of the vehicle seat or of the seat cushion part can be permitted if desired in order to reduce the degree of torsion of the vehicle operator's upper body. In this way, the present invention can be effectively further developed once again. Advantageously, however, the position of the operator with respect to the pedals and to the steering wheel hardly changes here, or only to a negligible extent. In this respect, the agricultural commercial vehicle can continue to be operated and steered in a sensible and especially safe manner. As already mentioned above, no pressure points or noteworthy sensations of discomfort occur for the vehicle operator as a result of unfavorable twisting of the seat cushion part under the buttocks as was previously often the case. In addition, since the contact of the legs and feet to the pedals can remain nearly unchanged, there is no critical impairment of the operation of the vehicle. The backrest part, a back extension mechanism or other additional elements thereof which perform a back support function advantageously adapt extremely well to the vehicle operator's anthropometry and the respective work task. Through the supplemental vehicle operator support device proposed according to the invention, all operator positions can be optimally supported. Above all with respect to the backwards-facing seated working position, nearly optimal support of the vehicle operator's upper body can be achieved, for example, by means of a back extension mechanism that can swing in laterally.

An alternative support can ideally be provided by a comfort-optimized, particularly left-side armrest part having in its inner side, i.e., on the side facing the vehicle operator, an additional contour or support surface that is adapted to the vehicle operator's anthropometry. In this way, a nearly maximum support surface can be achieved in all essential operating positions to provide additional support to the vehicle operator. This significantly reduces the stress on the vehicle operator. Since the body can be supported significantly better even in awkward positions, the vehicle operator maintains his performance over a significantly longer period of time. In addition, it is known that maximum support of the body via the back cushion advantageously reduces stress on the spinal column. Moreover, good support prevents loss of control of the vehicle due to a lack of support surfaces for the vehicle operator. What is more, the vehicle operator is advantageously given the opportunity to assume different and sensibly supported bodily positions in an especially easy and comfortable manner, which is an essential prerequisite for driving over extended periods without an excessive drop in performance, and, what is more, a health hazard from working for extended periods in an awkward position is reduced.

One especially important advantage of the invention lies in its extraordinarily user-friendly ease of use. An automatic adaptation of the vehicle seat to different bodily positions is extremely important in order to unburden the vehicle operator particularly from distracting adjustment actions aimed at achieving a favorable and more comfortable vehicle seat setting during vehicle operation. After all, health-preserving functions should occur as automatically as possible, since the vehicle operator is occupied with carrying out individual driving tasks and is already under very high operating stress, anyway. Adjustment actions that are not a direct part of the driving task or that are not absolutely necessary are often neglected and not carried out or only too late.

It should be pointed out here explicitly that nearly all of the movement-related variants of the supplemental vehicle operator support device explained above, especially in relation to the displacement mechanism in this context as well, can be implemented electrically, pneumatically, hydraulically and/or mechanically, depending on what possibilities a vehicle offers in which the present vehicle seat is used.

A translational or rotatory movement of the supplemental vehicle operator support device can also be initiated, for example, by directly exerting force on the supplemental vehicle operator support device on a certain area and/or in a certain pressure direction on the supplemental vehicle operator support device, for instance according to the principle of a ballpoint pen. Here, the supplemental vehicle operator support device is mounted, for instance, in a pretensioned manner on the armrest part and, by actuating a mechanism, the supplemental vehicle operator support device is released and can be moved from a standby position into a working position.

In general, both stepped movement and continuous movement of the supplemental vehicle operator support device are possible.

As will also readily be understood, a movement of the supplemental vehicle operator support device can be done mechanically, hydraulically, pneumatically or even by means of electric motors, depending on what technical prerequisites are available in the respective commercial vehicle.

The object of the invention is also achieved by a commercial vehicle, particularly by an agricultural commercial vehicle, that is characterized by a vehicle seat for a vehicle operator according to one of the features described herein.

With a particularly agricultural commercial vehicle equipped with the vehicle seat according to the invention, a vehicle operator is substantially better supported and protected than previously possible.

Further advantages, goals and characteristics of the present invention are explained on the basis of the enclosed drawing and the following description, in which several vehicle seats with initial possible embodiments with respect to a supplemental vehicle operator support device are illustrated and described.

FIG. 3A shows a schematic view of an alternative vehicle seat with a supplemental vehicle operator support device mounted on an armrest part in a substantially vertically movable manner in a special support operating state with extended supplemental vehicle operator support device;

FIG. 3B shows a schematic side view of the alternative vehicle seat of FIG. 3A in the special operating state with extended supplemental vehicle operator support device;

FIG. 3C shows a first schematic perspective view of the alternative vehicle seat of FIGS. 3A and 3B in the special operating state with extended supplemental vehicle operator support device;

FIG. 3D shows another schematic perspective view of the alternative vehicle seat of Figures 3A to 3C in a normal operating state with retracted supplemental vehicle operator support device;

FIG. 4A shows a schematic view of another vehicle seat with a supplemental vehicle operator support device mounted on an armrest part so as to fold substantially about a horizontal folding axis in a special support operating state with folded-out supplemental vehicle operator support device;

FIG. 4B shows a schematic side view of the other vehicle seat of FIG. 4A in the special operating state with folded-out supplemental vehicle operator support device;

FIG. 4C shows a first schematic perspective view of the other vehicle seat of FIGS. 4A and 4B in the special operating state with folded-out supplemental vehicle operator support device;

FIG. 4D shows an additional schematic perspective view of the other vehicle seat of Figures 4A to 4C in a normal operating state with folded-in supplemental vehicle operator support device;

Figure 1A:
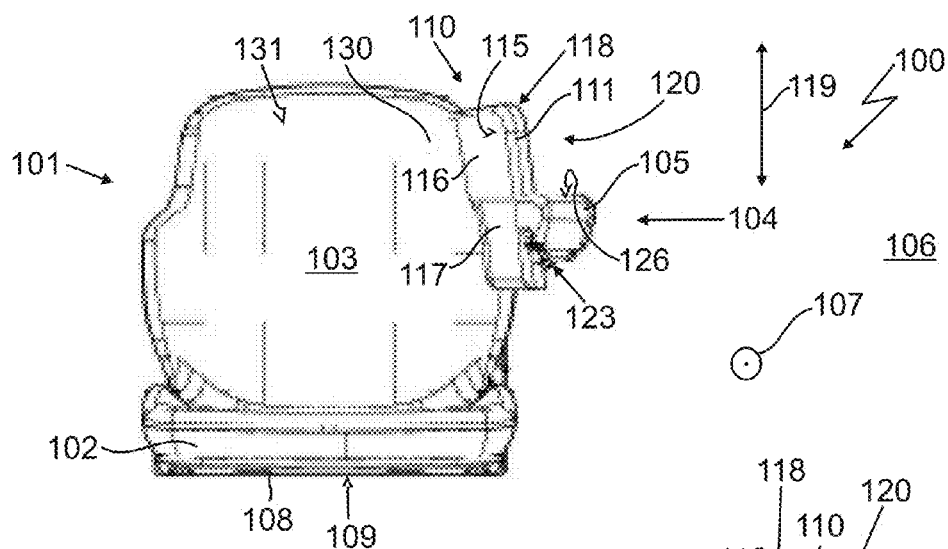
FIG. 1A shows a schematic front view of a vehicle seat with a supplemental vehicle operator support device that can be sunk substantially horizontally into an armrest part in a special support operating state with extended supplemental vehicle operator support device.
Figure 1B:
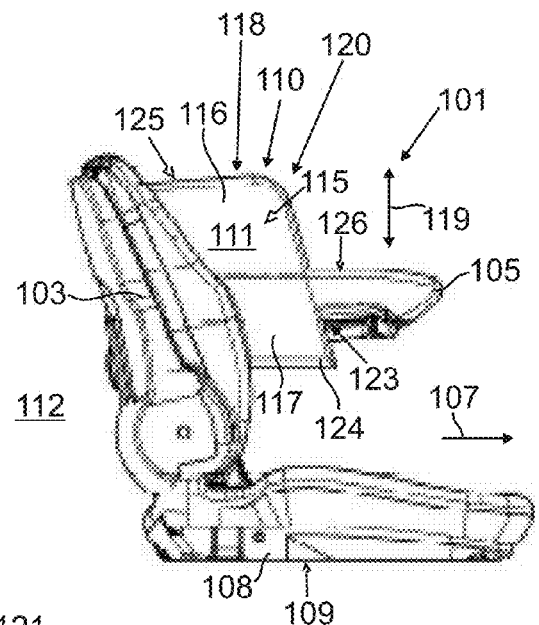
FIG. 1B shows a schematic side view of the vehicle seat of FIG. 1A in the special support operating state with extended supplemental vehicle operator support device.
Figure 1C:
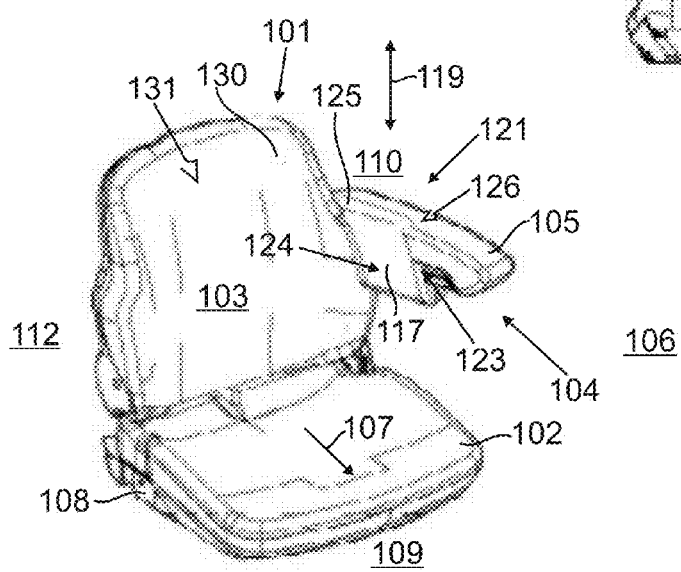
FIG. 1C shows a schematic perspective view of the vehicle seat of FIGS. 1A and 1B in a normal operating state with retracted supplemental vehicle operator support device.

The first sample embodiment 100 shown in FIGS. 1A to 1C shows, for the sake of example, a first vehicle seat 101 that is built into a vehicle cab (not shown here) of an agricultural commercial vehicle (not shown here).

The vehicle seat 101 essentially has a seat part 102, a backrest part 103 and a side part 104 in the form of an armrest part 105 which, seen in the forward driving direction 107 of the agricultural commercial vehicle, is attached to the left side 106 of the vehicle seat 101.

The vehicle seat 101 is attached via a vehicle seat support 108 on the bottom side 109 over a console (also not shown here) on a cab floor (not shown here) of the agricultural commercial vehicle. Optionally, the console can comprise a cushioning and/or damping mechanism for cushioning the vehicle seat 101.

According to the invention, the vehicle seat 101 further comprises a supplemental vehicle operator support device 111 that can be temporarily arranged in an otherwise vehicle seat-free support area 110, by means of which a passenger (not shown) sitting on the seat part 102 can be additionally supported when he has assumed an awkward position, for example in order to operate control elements (not shown) of the agricultural commercial vehicle arranged in the rearward area 112 of the vehicle seat 101, or in order to observe a piece of equipment behind the agricultural commercial vehicle.

The supplemental vehicle operator support device 111 is characterized by a supplemental support surface 115 which, in this first sample embodiment 100, is substantially formed by a moveable partial support area 116 of the supplemental vehicle operator support device 111.

The supplemental support surface 115 is advantageously enlarged by a stationary partial support area 117 which is arranged beneath the moveable partial support area 116 analogously to the supplemental support surface 115.

The supplemental support surface 115 is particularly made available by means of a moveable panel element 118 of the supplemental vehicle operator support device 111, which is mounted upwards and downwards on and across from the armrest part 105 according to the vertical directions 119.

Here, the supplemental support surface 115 is arranged with a substantially vertical orientation and facing both the seat part 102 and the backrest part 103, and hence the passenger as well.

According to FIGS. 1A and 1B, the supplemental vehicle operator support device 111 has assumed a working position 120 outside and above the armrest part 105. Accordingly, the vehicle seat 101 is in a special support operating state.

In the special support operating state, the passenger sitting on the vehicle seat 1, when in a laterally or rear-facing seated working position, can support himself additionally in a targeted manner at least at the level of his shoulder and rib cage area off-center to the side of the backrest part 103, as a result of which he is supported especially advantageously by the supplemental vehicle operator support device 111, especially in this awkward position. This was not previously possible.

According to FIG. 1C, the supplemental vehicle operator support device 111 has assumed a standby position 121 within the armrest part 105, so that the vehicle seat 101 is accordingly in a normal support operating state.

In the normal support operating state, in which the passenger has taken a seat on the vehicle seat 101 in a forward driving position so as to see to the front, the seat part 102, the backrest part 103 and the armrest part 105 form a main outer contour of the vehicle seat 101 on which the passenger can support himself.

Here, the supplemental vehicle operator support device 111 is moved between the standby position 121 and the working position 120 or vice versa by means of a displacement mechanism 123 not shown in further detail here, the displacement mechanism 123 comprising for this purpose vertically oriented cross-members and slide elements moveably mounted thereon (both not shown, since they are arranged within the armrest part 105).

In the standby position 121, the supplemental vehicle operator support device 111 is arranged completely within a pocket-like housing 124 of the armrest part 105, so that it does not get in the way on the outside.

In the standby position 121, the upper end 125 of the supplemental vehicle operator support device 111 forms at least a partial area of an armrest support surface 126 of the armrest part 105.

The operation or activation of the supplemental vehicle operator support device 111 occurs here automatically in an interactive manner by means of bodily force exerted on the backrest part 103 and thus advantageously without additional manually initiated triggering of control elements. For this purpose, a corresponding actuating device 130 is provided beneath a cushion surface 131 on top of the backrest part 103.

In the next sample embodiment 200 shown in FIGS. 2A to 2D, another vehicle seat 201 is also substantially comprised of a seat part 202, a backrest part 203 and a side part 204, which is again embodied in the form of an armrest part 205. The armrest part 205 is, when seen in the forward driving direction 207 of an agricultural commercial vehicle, attached to the left side 206 of the vehicle seat 201.

The vehicle seat 201 is attached via a vehicle seat support 208 on the bottom side 209 over a console (likewise not shown here) to a cab floor (not shown here) of the agricultural commercial vehicle, the console being able to comprise a cushioning and/or damping mechanism for cushioning the vehicle seat 201.

Figure 2A:
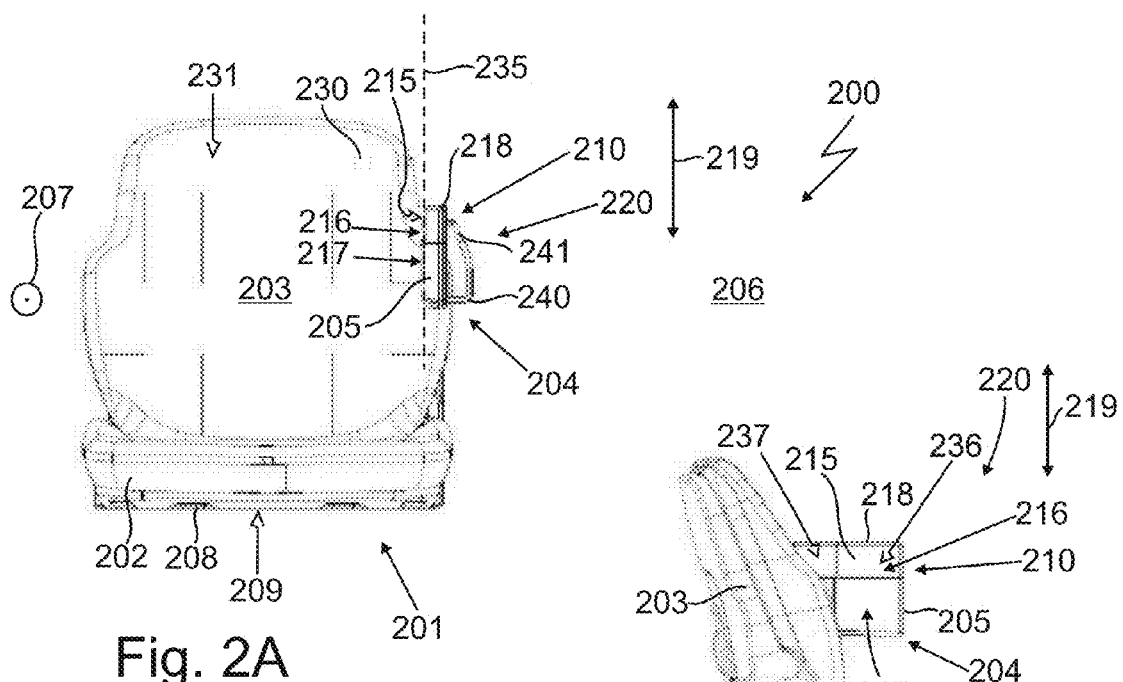
FIG. 2A shows a schematic front view of another vehicle seat with a supplemental vehicle operator support device moveably mounted in a substantially horizontal manner on an armrest part in a special support operating state with extended supplemental vehicle operator support device.
Figure 2B:
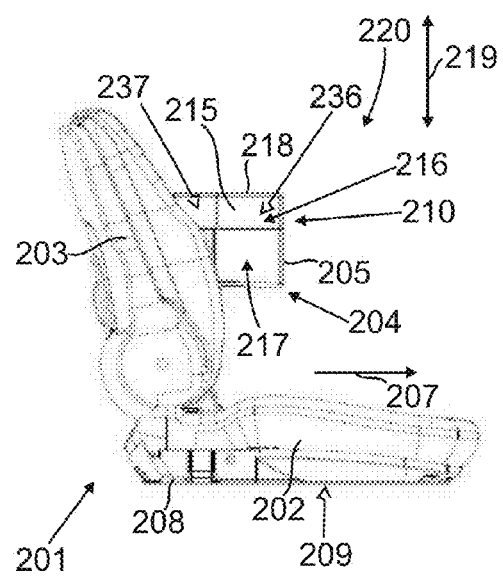
FIG. 2B shows a schematic side view of the vehicle seat of FIG. 2A in the special operating state with extended supplemental vehicle operator support device.
Figure 2C:
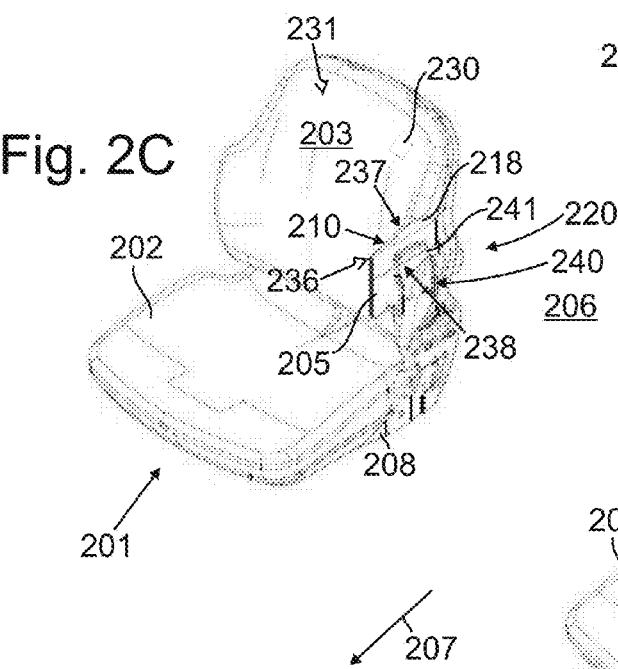
FIG. 2C shows a schematic perspective view of the other vehicle seat of FIGS. 2A and 2B in the special operating state with extended supplemental vehicle operator support device.
Figure 2D:
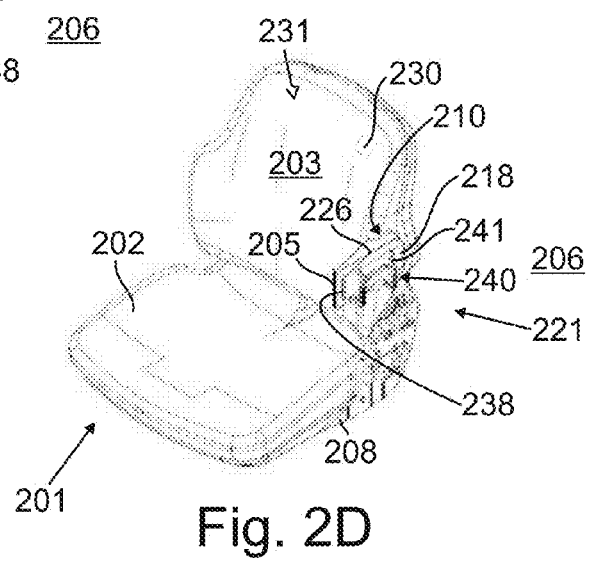
FIG. 2D shows a schematic perspective view of the other vehicle seat of FIGS. 2A to 2C in a normal operating state with retracted supplemental vehicle operator support device.

A supplemental vehicle operator support device 211 is attached to the armrest part 205 by means of a displacement mechanism 223 such that the supplemental vehicle operator support device 211 can be moved according to the vertical directions 219 between a working position 220 (see FIGS. 2A to 2C) and a standby position 221 (see FIG. 2D) upward and downward or vice versa depending on whether the vehicle seat 201 is used in a special support operating state (see FIGS. 2A to 2C) or in a special support operating state (see FIG. 2D).

The supplemental vehicle operator support device 211 itself has a moveable panel element 218 which, in this next sample embodiment 200, is always oriented edgewise independently of whether it is in the standby position 221 or in the working position 220.

In the working position 220, the supplemental vehicle operator support device 211 is itself arranged in an otherwise vehicle seat-free support area 210. In this respect, especially in the working position 220, the moveable panel element 218 makes a supplemental support surface 215 available which—exactly like in the first sample embodiment—is oriented substantially on a vertical plane 235 or parallel or skewed thereto.

The supplemental support surface 215 is contoured and somewhat concave-shaped in a front area 236, with the front area 236 merging into a somewhat flat, rear area 237 of the supplemental support surface 215.

The armrest part 205, which is arranged beneath the supplemental vehicle operator support device 211, has a similar or, ideally, identical shape when the supplemental vehicle operator support device 211 is in the working position 220.

A passenger can therefore be supplementally supported especially well overall according to the present invention on the supplemental vehicle operator support device 211 when he must assume the above-described awkward position.

Advantageously, the supplemental support surface 215 is enlarged here as well by a stationary partial support area 217 which is arranged beneath a moveable partial support area 216 of the supplemental vehicle operator support device 211 analogously to the supplemental support surface 215.

In the standby position 221, the supplemental vehicle operator support device 211 is disposed laterally next to the armrest part 205 on a side 238 particularly facing away from the seat part 202 such that the supplemental vehicle operator support device 211 is advantageously no longer arranged in the otherwise vehicle seat-free support area 210.

In addition, in the standby position 221, the supplemental vehicle operator support device 211 advantageously forms an extra-wide armrest support surface 226 together with the armrest part 205.

The displacement mechanism 223 has a curved pair of guide elements 240 on which a retaining element 241 of the supplemental vehicle operator support device 211 can be pushed in the vertical directions 219 along a curved path (not numbered here explicitly).

Here too, the supplemental vehicle operator support device 211 is operated or activated automatically and interactively by means of a bodily force exerted on the backrest part 203 and therefore advantageously without additional manually initiated triggering of control elements. For this purpose, a commensurate actuating device 230 is provided beneath a cushion surface 231 on top of the backrest part 203.

The alternative vehicle seat 301 depicted with respect to the third sample embodiment 300 shown in FIGS. 3A to 3D is characterized by a construction substantially equivalent to that already described with respect to the two sample embodiments 100 and 200.

For instance, it comprises a seat part 302, a backrest part 303, a side part 304 embodied as an armrest part 305, and a supplemental vehicle operator support device 311 that can be temporarily arranged in an otherwise vehicle seat-free support area 310 by means of which a passenger sitting on the vehicle seat 302 in the forward driving direction 307 can be additionally supported while in a laterally- or rearwards-oriented seating working position. Here as well, the armrest part 305 is attached to the left side 306 of the vehicle seat 301.

However, unlike the vehicle seats 101 and 201, the supplemental vehicle operator support device 311 is not moved vertically between a working position 320 (see FIGS. 3A to 3C) and a standby position 321 (see FIG. 3D), but horizontally according to horizontal directions 345 along a curved path 346 extending horizontally.

For this purpose, the vehicle seat 301 has a displacement mechanism 323 with a curved track element 347 that lies on a horizontal plane 348 (see FIG. 3B) and is attached to the armrest part 305 with its longitudinal extension oriented substantially in the forward driving direction 307. The curved track element 347 could also be arranged parallel or skewed to this horizontal plane 348.

In any case, the supplemental vehicle operator support device 311 can be moved by means of the displacement mechanism 323 at least partially into a rear area 312 behind the backrest part 303 and parked there temporarily in the standby position 321.

The supplemental vehicle operator support device 311 is always, i.e., both while in the standby position 321 and while in the working position 320, arranged above the armrest part 305.

In this respect, no additional space is required for the standby position 321 on the outside besides the armrest part 305. The armrest part 305 can also be very narrow in design, since it need not accommodate the supplemental vehicle operator support device 311 on the interior.

The supplemental vehicle operator support device 311 itself again has a moveable panel element 318 that is always arranged edgewise independently of whether it is in the standby position 321 or in the working position 320.

The supplemental vehicle operator support device 311 is itself arranged in the working position 320 in an otherwise vehicle seat-free support area 310. In this respect, especially in the working position 320, the moveable panel element 318 makes a supplemental support surface 315 available which is substantially vertical or perpendicular to the horizontal plane 348.

The supplemental support surface 315 is contoured and has a somewhat concave shape in a front area 336, the front area 336 merging into a somewhat flat, rear area 337 of the supplemental support surface 315. The armrest part 305 is similarly or, ideally, identically shaped.

A passenger can therefore on the whole be additionally supported especially well according to the present invention on the supplemental vehicle operator support device 311.

Here, too, the supplemental support surface 315 is advantageously enlarged by a stationary partial support area 317 (see only FIG. 3B) which is arranged beneath a moveable partial support area 316 (see only FIG. 3B) of the supplemental vehicle operator support device 311 analogously to the supplemental support surface 315.

The supplemental vehicle operator support device 311 is operated by means of an actuating device 330 that is arranged on the inside of the armrest part 305.

In the fourth sample embodiment 400 showed in FIGS. 4A to 4D, another vehicle seat 401 is again comprised substantially of a seat part 402, a backrest part 403 and a side part 404 in the form of an armrest part 405. The latter is attached to the left side 406 of the vehicle seat 401. The vehicle seat 401 installed in a vehicle cab (not shown here) of an agricultural commercial vehicle (not shown here) and attached to a cab floor (not shown here) of the agricultural commercial vehicle via a vehicle seat support 408 on the bottom side 409. Optionally, the console can comprise a cushioning and/or damping mechanism for cushioning the vehicle seat 401.

The vehicle seat 401 has a supplemental vehicle operator support device 411 that can be temporarily arranged in an otherwise vehicle seat-free support area 410. The supplemental vehicle operator support device 411 is characterized by a supplemental support surface 415 that is embodied by a moveable partial support area 416 of the supplemental vehicle operator support device 411. The supplemental support surface 415 is advantageously further enlarged by a stationary partial support area 417 which is arranged beneath the moveable partial support area 416 analogously to the supplemental support surface 415.

Particularly, the supplemental vehicle operator support device 411 and the supplemental support surface 415 are made available by means of a moveable panel element 418 that can be swiveled according to swivel directions 460 (see FIG. 1A) about a swivel axis 461 upward and downward with respect to the armrest part 405. For this purpose, the moveable panel element 418 is mounted directly on the armrest part 405 by means of a displacement mechanism 423.

The displacement mechanism 423 comprises self-locking hinge elements 462 (only numbered for the sake of example here) by means of which the supplemental vehicle operator support device 411 can be swiveled back and forth between a working position 420 (FIGS. 4a to 4C) and a standby position 421 (FIG. 4D).

When in the working position 420, the supplemental support surface 415 is arranged so as to run substantially vertically and face both the seat part 402 and the backrest part 403, and hence the passenger as well.

In the working position 420, the supplemental vehicle operator support device 411 is placed above the armrest part 105. Accordingly, the vehicle seat 401 is in a special support operating state.

In the standby position 421, the supplemental vehicle operator support device 411 is swung laterally beside the armrest part 405 on a side 438 particularly facing away from the seat part 402 such that the supplemental vehicle operator support device 411 is advantageously not arranged in the otherwise vehicle seat-free support area 410.

In its standby position 421, the supplemental vehicle operator support device 411 forms with its hinge side 463 and together with the armrest part 405 an extremely wide armrest support surface 426 (see FIG. 4D).

In this sample embodiment 400, the supplemental vehicle operator support device 411 can be easily folded upward into the working position 420.

Figure 5A:
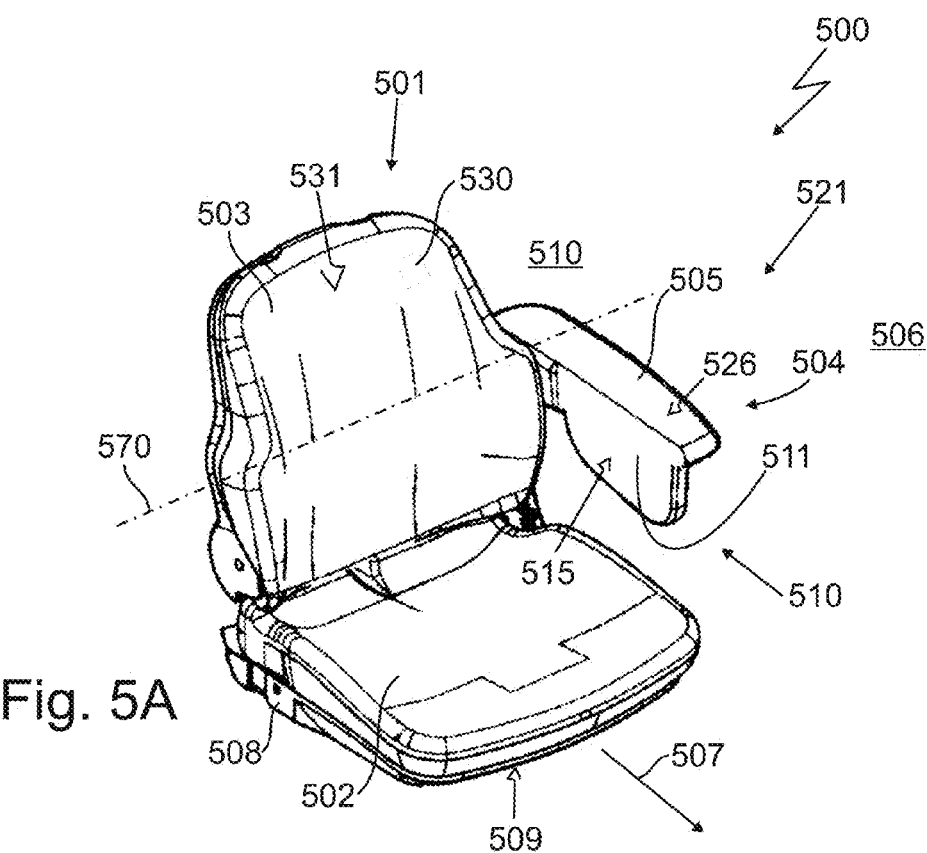
FIG. 5A shows a schematic perspective view of a vehicle seat in a normal support operating state with an armrest part comprising a supplemental vehicle operator support device.
Figure 5B:
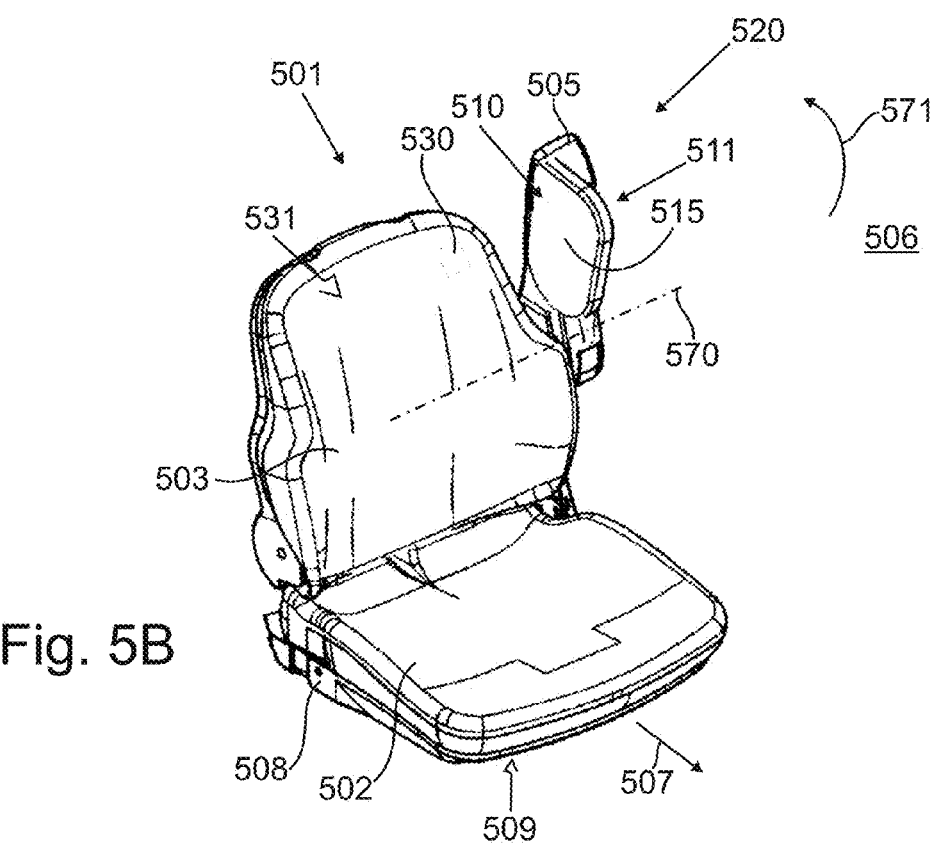
FIG. 5B shows another schematic perspective view of the vehicle seat of FIG. 5A in a special support operating state with supplemental vehicle operator support device moved upward.

The fifth sample embodiment 500 shown in FIGS. 5A and 5B shows another vehicle seat 501 used in an agricultural commercial vehicle which is substantially comprised of a seat part 502, a backrest part 503 and a side part 504 as an armrest part 505 that can be swiveled about a transverse axis 570. The armrest part 505 when viewed in the forward driving direction 507 of the agricultural commercial vehicle is attached to the left side 506 of the vehicle seat 501. The vehicle seat 501 is attached via a vehicle seat support 508 on the bottom side 509 over a console (not shown here) on a cab floor (also not shown here) of the agricultural commercial vehicle. Optionally, the console can comprise a cushioning and/or damping mechanism.

The armrest part 505 has beneath an armrest support surface 526 a supplemental vehicle operator support device 511 forming a supplemental support surface 515 which, in turn, can be moved into an otherwise vehicle seat-free support area 510 when the armrest part 505 is swiveled about the transverse axis and the supplemental vehicle operator support device 511 is moved at this juncture upward in a circular motion 571. In this fifth sample embodiment 500, the supplemental vehicle operator support device 511 is arranged in a stationary manner always below on the armrest part 505.

According to the illustration per FIG. 5A, the supplemental vehicle operator support device 511 is in a standby position 521 and the armrest part 505 can be used as an armrest. In this sense, the vehicle seat 501 is in a special support operating state (not explicitly numbered).

According to the additional illustration per FIG. 5B, the supplemental vehicle operator support device 511 is in a working position 520 in which the armrest part 505 cannot be used as an armrest. In this sense, the vehicle seat 501 is in a special support operating state here (not explicitly numbered).

A passenger can support himself on the vehicle operator support device 511 placed in this manner on the vehicle seat 501 very well for extended periods if he is in an awkward position, as already described many times above.

Here, the supplemental vehicle operator support device 511 is automatically controlled or activated interactively by means of bodily force exerted on the backrest part 503 and therefore advantageously without additional manually initiated triggering of control elements. For this purpose, a corresponding actuating device 530 is provided beneath a cushion surface 531 on top of the backrest part 503.

As will readily be understood, the sample embodiments explained above are merely initial designs of vehicle seats according to the invention. In this respect, the embodiment of the invention is not limited to these sample embodiments.

All features disclosed in the application documents are claimed as being essential to the invention insofar as they are novel compared to the art individually or in combination.

LIST OF REFERENCE SYMBOLS 100 first sample embodiment
101 vehicle seat
102 seat part
103 backrest part
104 side part
105 armrest part
106 left side
107 forward driving direction
108 vehicle seat support
109 bottom side
110 otherwise vehicle seat-free support area
111 supplemental vehicle operator support device
112 rear area
115 supplemental support surface
116 moveable partial support surface
117 stationary partial support surface
118 panel element
119 vertical directions
120 working position
121 standby position
123 displacement mechanism
124 housing
125 upper end
126 armrest support surface
130 actuating device 131 cushion surface
200 second sample embodiment
201 vehicle seat
202 seat part
203 backrest part
204 side part
205 armrest part
206 left side
207 forward driving direction
208 vehicle seat support
209 bottom side
210 otherwise vehicle seat-free support area
211 supplemental vehicle operator support device
215 supplemental support surface
216 moveable partial support surface
217 stationary partial support surface
218 panel element
219 vertical directions
220 working position
221 standby position
223 displacement mechanism
226 armrest support surface
230 actuating device
231 cushion surface
235 vertical plane
236 front area
237 rear area
238 side facing away
240 curved pair of guide elements
241 retaining elements
300 third sample embodiment
301 vehicle seat
302 seat part
303 backrest part
304 side part
305 armrest part
306 left side
307 forward driving direction
310 otherwise vehicle seat-free support area
311 supplemental vehicle operator support device
315 supplemental support surface
316 moveable partial support surface
317 stationary partial support surface
318 panel element
320 working position
321 standby position
323 displacement mechanism
330 actuating device
336 front area
337 rear area
345 horizontal directions
346 horizontally extending curved path
347 curved track element
348 horizontal plane
400 fourth sample embodiment
401 vehicle seat
402 seat part
403 backrest part
404 side part
405 armrest part
406 left side
407 forward driving direction
408 vehicle seat support
409 bottom side
410 otherwise vehicle seat-free support area
411 supplemental vehicle operator support device
415 supplemental support surface
416 moveable partial support surface
417 stationary partial support surface
418 panel element
420 working position
421 standby position
423 displacement mechanism
426 armrest support surface
438 side facing away
460 swivel direction
461 swivel axis
462 hinge elements
463 hinge side
500 fifth sample embodiment
501 vehicle seat
502 seat part
503 backrest part
504 side part
505 armrest part
506 left side
507 forward driving direction
508 vehicle seat support
509 bottom side
510 otherwise vehicle seat-free support area
511 supplemental vehicle operator support device
515 supplemental support surface
520 working position
521 standby position
526 armrest support surface
530 actuating device
531 cushion surface
570 transverse axis
571 circular motion

The invention claimed is:

1. A vehicle seat for supporting a vehicle operator in a seated position on the vehicle seat, the vehicle seat comprising:
a seat part, a backrest part, and a side part arranged on a first side of the vehicle seat, the side part comprising an armrest part;
a supplemental vehicle operator support device arranged on the side part of the vehicle seat, wherein the support device can be temporarily arranged in an otherwise vehicle seat-free support area, and wherein a vehicle operator seated on the vehicle seat can be additionally supported when in a laterally or rear-oriented seated working position;
wherein an opposing side of the vehicle seat from the first side is devoid of a supplemental vehicle operator support device;
wherein the supplemental vehicle operator support device comprises a support structure surface which is connected to the backrest part with its back area directed to the backrest part when arranged in the vehicle seat-free support area; and
wherein the supplemental vehicle operator support device is moveable independently of the movement of the side part.

2. The vehicle seat of claim 1, wherein the support surface structure is substantially rectangular.

3. The vehicle seat as set forth in claim 1, wherein the supplemental vehicle operator support device is attached to the side part, particularly to the armrest part, with a displacement mechanism by means of which the supplemental vehicle operator support device is arranged such that it can be moved from a standby position on the side part, particularly on the armrest part, into a supplemental support position in the otherwise vehicle seat-free support area.

4. The vehicle seat as set forth in claim 1, wherein a standby position of the supplemental vehicle operator support device is arranged at least partially within the side part, particularly within the armrest part.

5. The vehicle seat as set forth in claim 1, wherein a standby position of the supplemental vehicle operator support device is arranged to the side of the side part, particularly to the side of the armrest part, on a side facing away from the seat part and/or the backrest part.

6. The vehicle as set forth in claim 1, wherein a standby position of the supplemental vehicle operator support device is arranged so as to extend at least partially behind the backrest part.

7. The vehicle seat as set forth in claim 1, wherein the supplemental vehicle operator support device is arranged so as to be moveable vertically or horizontally with respect to the side part, particularly with respect to the armrest part.

8. The vehicle seat as set forth in claim 1, wherein the supplemental vehicle operator support device is arranged on the side part, particularly on the armrest part so as to be moveable along a curved path.

9. The vehicle seat as set forth in claim 1, wherein the supplemental vehicle operator support device is arranged on the side part, particularly on the armrest part such that it can be folded and can rotate about a swivel axis.

10. The vehicle seat as set forth in claim 1, wherein the supplemental vehicle operator support device comprises a moveable partial support area the surface of which is supplemented by a stationary partial support area.

11. The vehicle seat as set forth in claim 1, wherein the supplemental vehicle operator support device comprises a panel element with a supplemental support surface, said panel element being moveable with respect to the seat part, the backrest part and the side part, particularly the armrest part.

12. The vehicle seat as set forth in claim 1, wherein the supplemental vehicle operator support device is arranged directly above a substantially horizontal armrest surface of the vehicle seat.

13. The vehicle seat as set forth in claim 1, wherein the vehicle seat has an actuating device for actuating the supplemental vehicle operator support device, the actuating device being arranged on the side part, particularly on the armrest part, or on the backrest part.

14. A commercial vehicle, particularly an agricultural commercial vehicle, with a vehicle seat for a vehicle operator, characterized by a vehicle seat as set forth in claim 1.

* * * * *